US012591158B2

(12) United States Patent
Lee et al.

(10) Patent No.: US 12,591,158 B2
(45) Date of Patent: Mar. 31, 2026

(54) LIGHT ASSEMBLY, DISPLAY PANEL, AND METHOD FOR MANUFACTURING LIGHT ASSEMBLY

(71) Applicant: LG ELECTRONICS INC., Seoul (KR)

(72) Inventors: Uihyung Lee, Seoul (KR); Jungnam An, Seoul (KR); Soowang Seong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/074,208

(22) Filed: Mar. 7, 2025

(65) Prior Publication Data

US 2026/0036848 A1     Feb. 5, 2026

(30) Foreign Application Priority Data

Aug. 2, 2024     (KR) ......................... 10-2024-0103433
Oct. 22, 2024     (WO) ................ PCT/KR2024/016030

(51) Int. Cl.
*G02F 1/1335*     (2006.01)
*G02F 1/13357*     (2006.01)

(52) U.S. Cl.
CPC .. *G02F 1/133607* (2021.01); *G02F 1/133603* (2013.01)

(58) Field of Classification Search
CPC ................................................. G02F 1/133607
See application file for complete search history.

(56) References Cited

U.S. PATENT DOCUMENTS

| | | | | |
|---|---|---|---|---|
| 8,382,338 | B2 * | 2/2013 | Lee ........................... | F21V 5/04 |
| | | | | 362/311.06 |
| 8,508,689 | B2 * | 8/2013 | Kuwaharada ..... | G02F 1/133611 |
| | | | | 349/61 |
| 2007/0029563 | A1 * | 2/2007 | Amano ................... | G02B 3/02 |
| | | | | 257/E33.059 |
| 2009/0225543 | A1 * | 9/2009 | Jacobson ................ | F21V 13/04 |
| | | | | 250/493.1 |
| 2015/0241020 | A1 * | 8/2015 | Lee .......................... | G02B 3/02 |
| | | | | 362/257 |
| 2017/0200421 | A1 * | 7/2017 | Baek ................. | G02F 1/133308 |
| 2018/0036997 | A1 * | 2/2018 | Shimizu ................... | F21S 2/00 |
| 2019/0285950 | A1 * | 9/2019 | Liu ...................... | H05K 3/3431 |
| 2020/0285114 | A1 * | 9/2020 | Yamashita ........... | G02B 6/0078 |

FOREIGN PATENT DOCUMENTS

| | | |
|---|---|---|
| JP | 2013-125715 A | 6/2013 |
| JP | 10-2023-0143435 A | 10/2023 |
| KR | 10-2018-0004439 A | 1/2018 |
| KR | 10-2018-0036272 A | 4/2018 |
| KR | 10-2024-0001001 A | 1/2024 |

\* cited by examiner

*Primary Examiner* — Eric T Eide
(74) *Attorney, Agent, or Firm* — Birch, Stewart, Kolasch & Birch, LLP

(57) ABSTRACT

Provided is a light assembly including a light source substrate having an LED mounted thereon, and a light source lens constructed to cover the LED and having a curved upper surface, wherein the light source lens includes an anisotropic lens with a length in a first direction greater than a length in a second direction perpendicular to the first direction.

12 Claims, 13 Drawing Sheets

(a)

(b)

(c)

5242

5241

PCB (a)

(b)

5243    5242    5243

5241

PCB (c)

| No | Dispensing pitch | Dispensing number | Light source lens shape | Light shape |
|----|------------------|-------------------|-------------------------|-------------|
| 1 | 1mm | 2 | | |
| 2 | 2mm | 2 | | |
| 3 | 1.5mm | 3 | | |

FIG. 12

| Light source lens | Isotropic lens | Anisotropic lens 1 | Anisotropic lens 2 | Anisotropic lens 3 |
|---|---|---|---|---|
| Shape | | | | |
| Lens image | | | | |
| Brightness graph | | | | |
| X:Y Brightness ratio | 1:1 | 1:1.3 | 1:1.8 | 1:1.6 |

LIGHT ASSEMBLY, DISPLAY PANEL, AND METHOD FOR MANUFACTURING LIGHT ASSEMBLY

This application claims the benefit of Korean Patent Application No. 10-2024-0103433, filed on Aug. 2, 2024, and PCT International Application No. PCT/KR2024/016030, filed on Oct. 22, 2204, which is hereby incorporated by reference as if fully set forth herein.

BACKGROUND

Field

The present disclosure relates to a light assembly having an improved shape of a light source lens that covers an LED, a display device including the same, and a method for manufacturing the light assembly.

Discussion of the Related Art

With growth of information society, demand for various display devices has increased. In order to satisfy such demand, in recent years, a liquid crystal display (LCD), a field emission display (FED), a plasma display panel (PDP), and an electroluminescent device have been developed as display devices.

A liquid crystal panel of the liquid crystal display includes a liquid crystal layer and a TFT substrate and a color filter substrate opposite each other in the state in which the liquid crystal layer is interposed therebetween, wherein a picture is displayed using light provided from a backlight unit. The liquid crystal display is used in various devices ranging from a television, a laptop computer, a desktop computer monitor, and a mobile phone. The backlight unit is a device that is coupled to a rear surface of a display panel, transforms light provided from a light source into a uniform surface light source, and provides the uniform surface light source to the liquid crystal panel.

As the light source, a light emitting diode is attracting attention as a new material because it does not pollute environment, is able to express various colors, and is able to reduce power consumption. The light emitting diode (LED) is a well-known semiconductor light emitting element that converts current into light, and has various advantages such as long life, low power consumption, excellent initial operation characteristics, and high vibration resistance, compared to a filament-based light emitting element.

Recently, brightness of the backlight unit may be increased using a mini LED that is about 100 to 500 micrometers (m) in size, which is about one-tenth the length of a general LED chip.

However, the existing mini LED has a limitation in terms of low autonomy in LED arrangement and quantity caused by an arrangement in a shape close to a square. Therefore, to increase the autonomy in the LED arrangement, it is necessary to control a diffusion shape of light emitted from a single LED such that the light is diffused to be biased to a specific direction rather than in the square shape.

SUMMARY

The present disclosure is to provide a light assembly capable of diffusion of light in an anisotropic shape by improving a shape of a light source lens covering an LED, a display device including the same, and a method for manufacturing the light assembly.

Provided is a light assembly including a light source substrate having an LED mounted thereon, and a light source lens constructed to cover the LED and having a curved upper surface, wherein the light source lens includes an anisotropic lens with a length in a first direction greater than a length in a second direction perpendicular to the first direction.

The light source lens may have a diffusion angle in the first direction greater than a diffusion angle in the second direction.

The light source lens may include a concave portion positioned at a center in the first direction, and a pair of peak portions positioned on both sides of the concave portion in the first direction and having a vertical level higher than a vertical level of the concave portion.

A length in the second direction of the concave portion may be smaller than a length in the second direction of the peak portion.

A spacing between the pair of peak portions may be greater than a length in the first direction of the LED.

The pair of peak portions may have different vertical levels.

The LED and the light source lens may be in close contact with each other with an air layer omitted therebetween.

The LED may have a greater length in the first direction.

The length in the first direction of the light source lens may be at least 1.3 times the length in the second direction of the light source lens.

The LED may include a plurality of LEDs arranged in an array in the first direction and the second direction, and a spacing between the plurality of LEDs in the first direction may be greater than a spacing therebetween in the second direction.

The light source lens may include at least one of silicone, polymethyl methacrylate (PMMA), and polycarbonate (PC).

The anisotropic lens positioned at an edge of the light source substrate may be disposed such that the first direction aligns with the edge.

The light source lens may include the anisotropic lens disposed adjacent to an edge of the light source substrate, and an isotropic lens disposed at a central portion of the light source substrate.

Provided is a display device including a display panel, and a backlight unit that is located on a rear surface of the display panel and emits light, wherein the backlight unit includes a light source substrate having an LED mounted thereon, a light source lens constructed to cover the LED and having a curved upper surface, and an optical sheet that converts light emitted from a light assembly into a uniform surface light source, wherein the light source lens includes an anisotropic lens with a length in a first direction greater than a length in a second direction perpendicular to the first direction.

Provided is a method for manufacturing a light assembly including mounting an LED on a light source substrate, and forming a light source lens constructed to cover the LED, wherein the forming of the light source lens includes dispensing resin at a first location spaced apart from the LED on one side in a first direction, and dispensing the resin at a second location spaced apart from the light source on the other side in the first direction.

A spacing between the first location and the second location may be greater than a length in the first direction of the LED.

The mounting of the LED may include mounting the LED on the light source substrate such that a longitudinal direction of the LED matches the first direction.

The method may further include dispensing the resin at a location between the first location and the second location.

The light assembly of the present disclosure may implement light that is diffused in the anisotropic shape.

In addition, the light assembly of the present disclosure may easily implement the anisotropic light source lens.

In addition, the light assembly of the present disclosure increases the degree of freedom in the arrangement of the LEDs.

The effects obtained by the present disclosure are not limited to the above-mentioned effects, and other effects not mentioned will be clearly understood by those skilled in the art to which the present disclosure pertains from the following description.

BRIEF DESCRIPTION OF THE DRAWINGS

The accompanying drawings, which are included to provide a further understanding of the disclosure and are incorporated in and constitute a part of the present application, illustrate embodiment(s) of the disclosure and together with the description serve to explain the principle of the disclosure. The above and other aspects, features, and advantages of the present disclosure will become more apparent upon consideration of the following description of preferred embodiments, taken in conjunction with the accompanying drawing figures. In the drawings:

FIG. 11 is a view that graphically illustrates features of embodiments of a light assembly of the present disclosure;

FIG. 12 is a graph showing brightness of anisotropic lenses implemented by embodiments of a light assembly of the present disclosure.

DESCRIPTION OF SPECIFIC EMBODIMENTS

Figure 1:
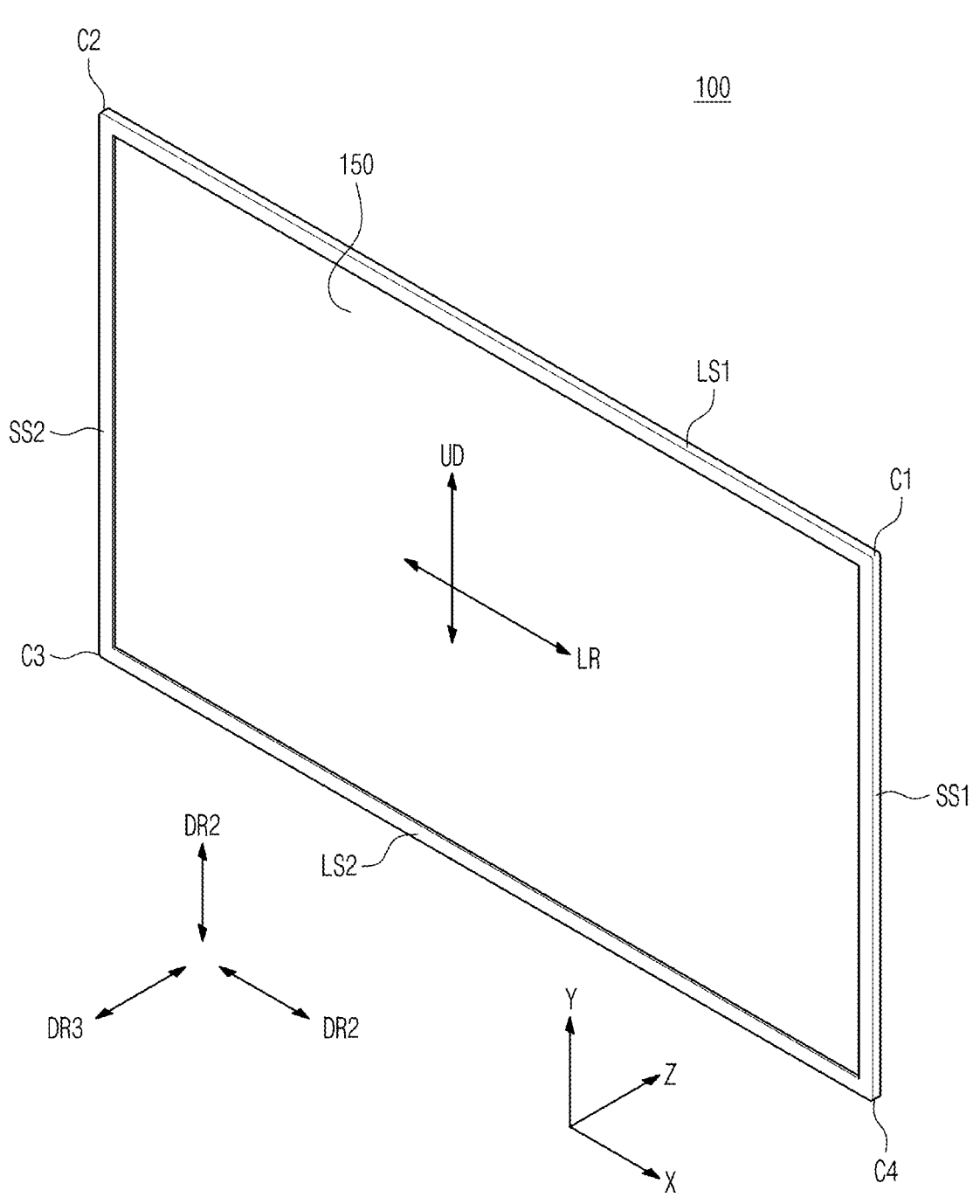
FIG. 1 is a perspective diagram illustrating an example of a display device of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Meanwhile, an image display device described in this specification is, for example, an intelligent image display device having a computer supporting function in addition to a broadcast reception function, wherein an Internet function may be added while the broadcast reception function is devotedly performed, whereby an interface that is more conveniently used, such as a handwriting type input device, a touchscreen, or a space remote control, may be provided. In addition, the image display device may be connected to the Internet or a computer through support of a wired or wireless Internet function, whereby various functions, such as e-mail, web browsing, banking, or gaming, may be executed. For such various functions, a standardized general-purpose OS may be used.

In the image display device described in the present disclosure, therefore, various applications may be freely added or deleted, for example, on a general-purpose OS kernel, whereby various user friendly functions may be executed. More specifically, the image display device may be a network TV, an Hbb TV, or a smart TV, and is applicable to a smartphone depending on circumstances.

FIG. 1 is a front perspective diagram illustrating an example of a display device of the present disclosure. A display device 100 of the present disclosure may have a rectangular main body including a pair of long sides and a pair of short sides. It may include a first long side LS1, a second long side LS2 facing the first long side LS1, a first short side SS1 adjacent to the first long side LS1 and the second long side LS2, and a second short side SS2 facing the first short side SS1.

A long side extending in a horizontal direction and a short side extending in a vertical direction are illustrated in the drawing, but the long side and the short side may have the same length, and the long side may be disposed in the vertical direction.

For convenience of explanation, the following description is made based on an embodiment in which a side extending in the horizontal direction (i.e., x-axis direction) and a side extending in the vertical direction (i.e., y-axis direction) are referred to as a long side and a short side, respectively, but the present disclosure is not limited thereto.

A first direction DR1 may be a direction parallel to the long sides LS1 and LS2 of the display device 100, and a second direction DR2 may be a direction parallel to the short sides SS1 and SS2 of the display device 100. A third direction DR3 may be a direction perpendicular to the first direction DR1 and/or the second direction DR2.

The side of the display device 100 on which a picture is displayed may be referred to as a front side or a front surface. When the display device 100 displays the picture, the side of the display device 100 from which the picture cannot be viewed may be referred to as a rear side or a rear surface.

When viewing the display device 100 from the front side or the front surface, the side of the first long side LS1 may be referred to as an upper side or an upper surface. In the same manner, the side of the second long side LS2 may be referred to as a lower side or a lower surface. In the same manner, the side of the first short side SS1 may be referred to as a right side or a right surface, and the side of the second short side SS2 may be referred to as a left side or a left surface.

The display device may include a display unit 120 configured to output an image. A driving signal may be generated by converting an image signal, a data signal, an OSD signal, a control signal, or the like received from the interface unit, which are processed by the controller 180. The display unit 150 may include a display panel including a plurality of pixels.

Each of the plurality of pixels in the display panel may include RGB subpixels. Alternatively, each of the plurality of pixels in the display panel may include RGBW subpixels. The display module 151 may convert an image signal, a data signal, an OSD signal, and a control signal processed by the controller 180 to generate a driving signal for the plurality of pixels.

The display device 100 includes a display unit 120 that occupies most of a front area and a case that covers a rear side, a lateral side and the like of the display unit 120 and packages the display unit 120.

The display unit 150 may be a Plasma Display Panel (PDP), a Liquid Crystal Display (LCD), an Organic Light Emitting Diode (OLED), a flexible display, or the like, and may also be a 3D display. The 3D display unit 150 may be classified into a glasses-free type or a glasses type.

An LCD display is supplied with light through a backlight unit because it is difficult to emit light by itself. The backlight unit is a device that uniformly supplies light supplied from a light emitting lamp to liquid crystals located on a front surface. As the backlight unit becomes thinner and thinner, a thin LCD can be implemented.

Figure 2:
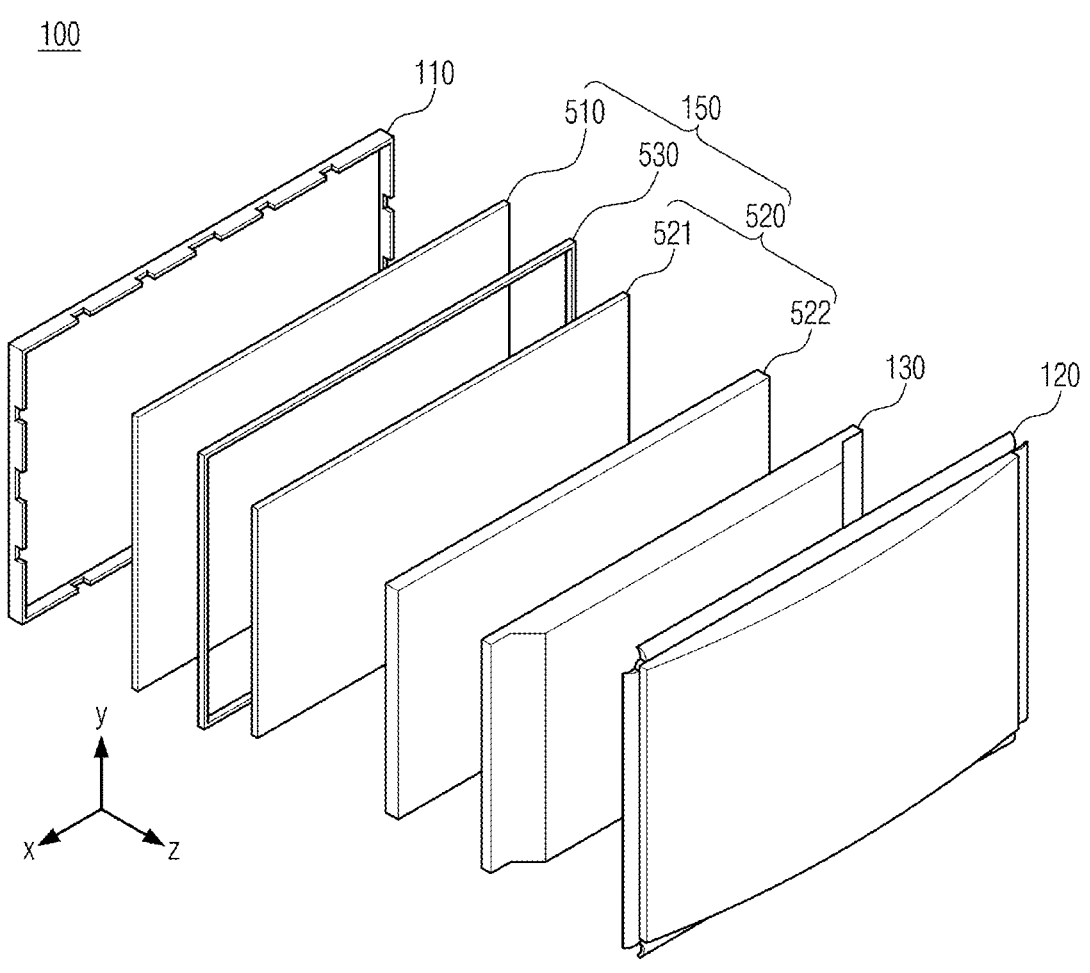
FIG. 2 is an exploded perspective diagram illustrating an example of a display device of the present disclosure.

FIG. 2 is an exploded diagram illustrating a display device of the present disclosure. Referring to FIG. 2, a display unit 120 of the present disclosure is an LCD display including a display panel 510 and a backlight unit 520.

A front cover 110 may cover at least a portion of a front surface and a side surface of the display panel 510. The front cover 110 may be divided into a front cover positioned on a side of the front surface of the display panel 510 and a side cover positioned on a side of the side surface of the display panel 510. The front cover and the side cover may be separately configured. One of the front cover and the side cover may be omitted.

The display panel 510 is provided to a front surface of the display device 100 to display an image. The display panel 510 may display an image by allowing a plurality of pixels to output Red, Green, or Blue (RGB) per pixel according to a timing. The display panel 510 may be divided into an active area in which an image is displayed and a de-active area in which an image is not displayed. The display panel 510 may include a front substrate and a rear substrate facing each other with a liquid crystal layer interposed therebetween.

The front substrate may include a plurality of pixels consisting of Red (R), Green (G), and Blue (B) subpixels. The front substrate may output light corresponding to a color of red, green, or blue according to a control signal.

The rear substrate may include switching elements. The rear substrate may switch pixel electrodes. For example, the pixel electrode may change molecular arrangement of a liquid crystal layer according to a control signal applied from the outside. The liquid crystal layer may include liquid crystal molecules. The liquid crystal molecules may change the arrangement based on a voltage difference generated between a pixel electrode and a common electrode. The liquid crystal layer may transmit the light provided from the backlight unit 520 to the front substrate or block the light.

The backlight unit 520 may be located behind the display panel 510. The backlight unit 520 may include light sources. The backlight unit 520 may be coupled to a front side of a frame 130.

The backlight unit 520 may be driven in a full driving mechanism or a partial driving mechanism such as local dimming or impulsive. The backlight unit 520 may include an optical sheet 521 and an optical layer 522.

A guide panel 530 for aligning the positions of the display panel 510 and the backlight unit 520 may be included. The guide panel 530 has a frame shape having four sides, and the display panel 510 and the backlight unit 520 may be seated on a front surface.

The optical sheet 521 may allow light from a light assembly 524 to be evenly transmitted to the display panel 510. The optical sheet 521 may be composed of layers. For example, the optical sheet 521 may include a prism sheet, a diffusion sheet, and the like.

The optical sheet 521 may include a coupling part. The coupling part may be coupled to the front cover 110, the frame 130, and/or the back cover 120. Alternatively, the coupling part may be coupled to a structure formed/coupled on/to the front cover 110, the frame 130, and/or the back cover 120.

The frame 130 may serve to support components of the display device 100. For example, a configuration such as the backlight unit 520 may be coupled to the frame 130. The frame 130 may be made of a metal material such as an aluminum alloy, etc.

The back cover 120 may be located on or behind a rear surface of the display device 100. The back cover 120 may be coupled to the frame 130 and/or the front cover 110. For example, the back cover 120 may be an injection molding product made of a resin material.

Figure 3:
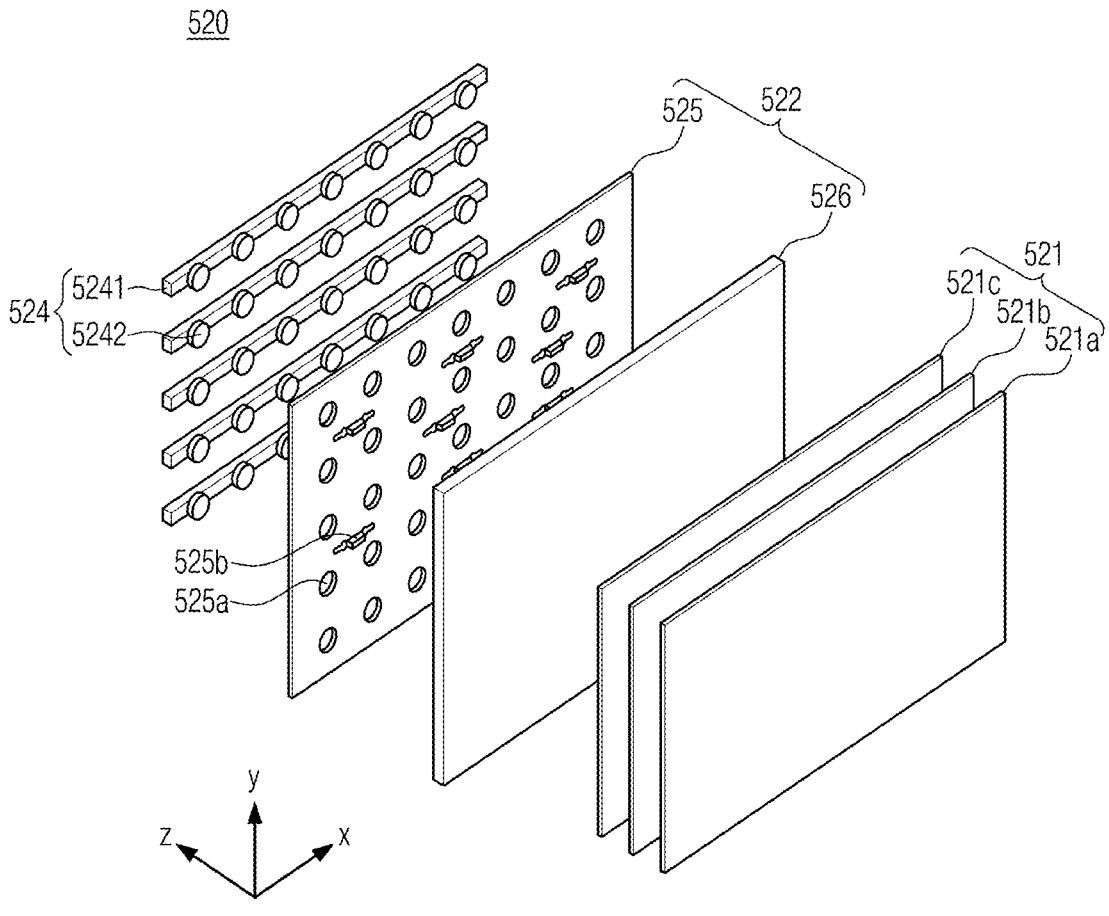
FIG. 3 is a diagram illustrating an embodiment of a backlight unit of a display device.

FIG. 3 is a diagram illustrating an embodiment of the backlight unit 520 of the display device 100.

The backlight unit 520 may include a light assembly 524, an optical layer 522 including a reflective sheet 525 and a diffusion plate 526, and an optical sheet 521 located on a front side of the optical layer 522.

The present embodiment is characterized in that the light assembly 524 is disposed in an array in a rear direction of the display panel 510 as a direct backlight unit 520. The light assembly 524 may include a light source substrate 5241 and a light emitting lamp 5242 mounted on the light source substrate 5241.

The light source substrate 5241 may be configured in the form of a plurality of straps extending in a first direction and spaced apart from each other by a prescribed distance in a second direction orthogonal to the first direction.

At least one light emitting lamp 5242 may be mounted on the light source substrate 5241. An electrode pattern for connecting an adapter and the light emitting lamp 5242 may be formed on the light source substrate 5241. For example, a carbon nanotube electrode pattern for connecting the light emitting lamp 5242 and the adapter may be formed on the light source substrate 5241.

The light source substrate 5241 may be composed of at least one of polyethylene terephthalate (PET), glass, polycarbonate (PC), and silicon. The light source substrate 5241 may be a Printed Circuit Board (PCB) on which the at least one light emitting lamp 5242 is mounted.

The light emitting lamp 5242 may be disposed on the light source substrate 5241 at a prescribed interval in the first direction. A diameter of the light emitting lamp 5242 may be greater than a width of the light source substrate 5241. That is, it means that the diameter may be greater than the length of the light source substrate 5241 in the second direction.

The light emitting lamp 5242 may be a light emitting diode (LED) chip or a light emitting diode package including at least one light emitting diode chip.

The light emitting lamp 5242 may be composed of a colored LED or a white LED that emits at least one color among colors such as Red (R), Blue (B), Green (G), and the like. The colored LED may include at least one of a red LED, a blue LED, and a green LED.

The reflective sheet 525 may be located on a front side of the light source substrate 5241. The reflective sheet 525 may be located on an area other than an area in which the light emitting lamp 5242 of the light source substrate 5241 is formed. The reflective sheet 525 may include a plurality of through-holes 525a.

The reflective sheet 525 may reflect the light emitted from the light emitting lamp 5242 toward the front side. Also, the reflective sheet 525 may reflect the light reflected from the diffusion plate 526 again.

A diffusion plate supporter 525b that maintains a gap between the light emitting lamp 5242 and the diffusion plate 526 may be further included so that the light of the light emitting lamp 5242 is evenly supplied to a rear surface of the diffusion plate 526.

The reflective sheet 525 may include at least one of a metal and a metal oxide that are reflective materials. For example, the reflective sheet 525 may include a metal and/or a metal oxide having high reflectivity, such as at least one of aluminum (Al), silver (Ag), gold (Au), and titanium dioxide (TiO2).

A resin may be deposited on the light emitting lamp 5242 and/or the reflective sheet 525. The resin may serve to diffuse light emitted from the light emitting lamp 5242. The diffusion plate 526 may diffuse light emitted from the light emitting lamp 5242 upward.

The optical sheet 521 may be positioned in front of the diffusion plate 526. A rear surface of the optical sheet 521 may be in close contact with the diffusion plate 526, and a front surface of the optical sheet 521 may be in close contact with the rear surface of the display panel 510 (refer to FIG. 1).

The optical sheet 521 may include at least one sheet. In detail, the optical sheet 521 may include one or more prism sheets and/or one or more diffusion sheets. A plurality of the sheets included in the optical sheet 521 may be in an adhesive state and/or in a close contact state.

The optical sheet 521 may be composed of a plurality of sheets having different functions. For example, the optical sheet 521 may include first to third optical sheets 521a to 521c. For example, a first optical sheet 521a may be a diffusion sheet, and second and third optical sheets 521b and 521c may be prism sheets. The number and/or positions of the diffusion and prism sheets may be changed.

The diffusion sheet 521 may prevent the light emitted from the diffusion plate 526 from being partially concentrated, thereby making light distribution more uniform. The prism sheet may condense light emitted from the diffusion sheet and provide the light to the display panel 510.

A coupling part may be formed on at least one of the sides or edges of the optical sheet 521. The coupling part may be formed on at least one of the first to third optical sheets 521a to 521c.

The coupling part may be formed on a long side of the optical sheet 521. The coupling part formed on a first long side and the coupling part formed on a second long side may be asymmetric. For example, it means that the positions and/or number of the coupling parts of the first long side and the coupling part of the second long side may be different from each other.

Figure 4:
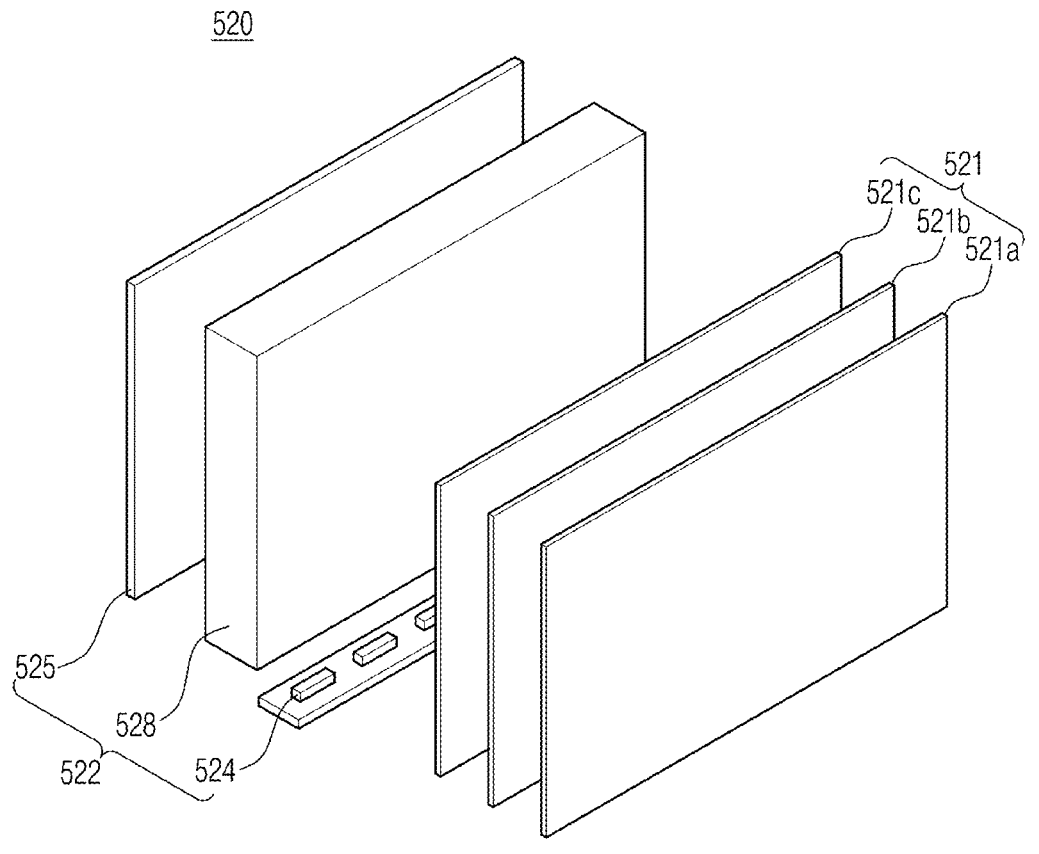
FIG. 4 is a diagram illustrating another embodiment of a backlight unit of a display device.

FIG. 4 is a diagram illustrating another embodiment of a backlight unit 520 of the display device 100. The backlight unit 520 of the present embodiment is an edge-type backlight unit 520 in which a light assembly 524 exists only in a lateral direction.

A light source substrate 5241 may be located on at least one side of another configuration of an optical layer 522. Light emitting lamps 5242 or an electrode pattern for connecting an adapter and the light emitting lamp 5242 may be formed on the light source substrate 5241. For example, a carbon nanotube electrode pattern for connecting the light emitting lamp 5242 to the adapter may be formed on the light source substrate 5241. For example, the light source substrate 5241 may be a Printed Circuit Board (PCB).

The light emitting lamps 5242 may be disposed on the light source substrate 5241 at a predetermined interval. The light emitting lamp 5242 may be smaller than a thickness of a light guide plate 528. Therefore, most of the light provided by the light emitting lamp 5242 may be transmitted to the light guide plate 528.

The light emitting lamp 5242 may be a Light Emitting Diode (LED) chip or a light emitting diode package including at least one light emitting diode chip.

The light emitting lamp 5242 may be composed of a colored LED or a white LED that emits at least one color among colors such as red, blue, and green.

A light source included in the light emitting lamp 5242 may be a Chip On Board (COB) type. The COB type may be a type in which an LED chip, which is a light source, is directly coupled to the light source substrate 5241. Therefore, a process may be simplified. In addition, resistance may be lowered, and thus energy lost to heat may be reduced. That is, it means that power efficiency of the light emitting lamp 5242 may be increased. The COB type may provide brighter lighting. The COB type may be implemented thinner and lighter than the related art.

The light guide plate 528 may diffuse light incident from the light emitting lamp 5242. A reflective sheet 525 may be positioned behind the light guide plate 528. The reflective sheet 525 may reflect light provided from the light emitting lamp 5242. The reflective sheet 525 may reflect light introduced from the light guide plate 528 back to the front of the light guide plate 528.

The reflective sheet 525 may include at least one of a metal and a metal oxide that are reflective materials. For example, the reflective sheet 525 may include a metal and/or a metal oxide having high reflectivity, such as at least one of aluminum (Al), silver (Ag), gold (Au), and titanium dioxide (TiO2).

The reflective sheet 525 may be formed by depositing and/or coating a metal or a metal oxide. The reflective sheet 525 may be printed with ink containing a metal material. The reflective sheet 525 may have a deposition layer using vacuum deposition such as thermal deposition, evaporation, or sputtering. The reflective sheet 525 may have a coating layer and/or a printing layer formed by printing, gravure coating, or silk screen.

A diffusion plate (not shown) may be further included on a front surface of the light guide plate 528. The diffusion plate may diffuse light emitted from the light guide plate 528 forward.

An air gap may be positioned between the light guide plate 528 and the optical sheet 521. The air gap may disperse light emitted from the light emitting lamp 5242.

The optical sheet 521 may be located in front of the light guide plate 528. A rear surface of the optical sheet 521 may face the light guide plate 528, and a front surface of the optical sheet 521 may face a rear surface of the display panel 510.

The optical sheet 521 may include at least one sheet. The optical sheet 521 may include one or more prism sheets and/or one or more diffusion sheets. A plurality of the sheets included in the optical sheet 521 may be in an attached state and/or a close contact state.

For example, the optical sheet 521 may include first to third optical sheets 521a to 521c. The first optical sheet 521a may be a diffusion sheet, and the second and third optical sheets 521b and 521c may be prism sheets. The number and/or positions of the diffusion and prism sheets may be changed.

The diffusion sheet 521a may prevent the light emitted from the light guide plate 528 from being partially concentrated, thereby making the distribution of light uniform. The prism sheets 521b and 521c may condense the light emitted from the diffusion sheet 521a and provide the light toward the display panel 510.

Figure 5:
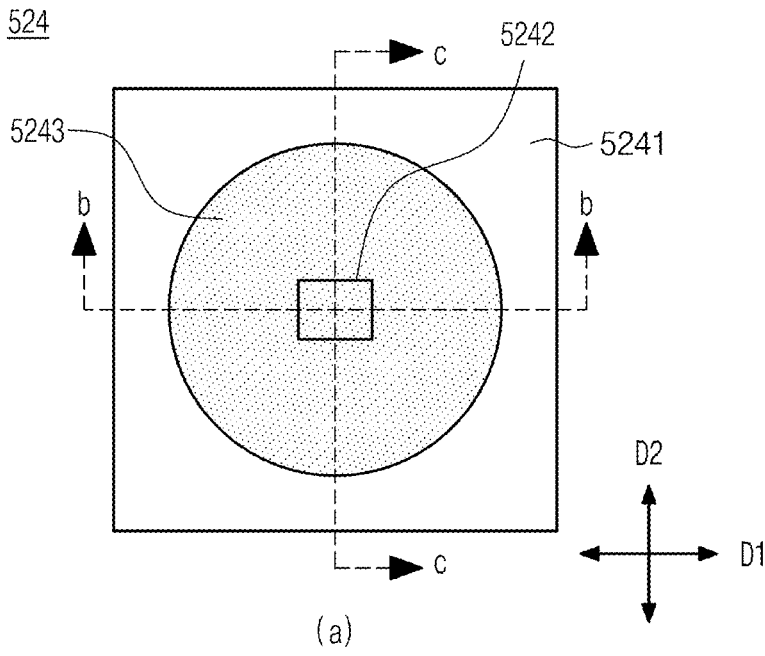
FIG. 5 is a view showing an existing light assembly.
Figure 5:
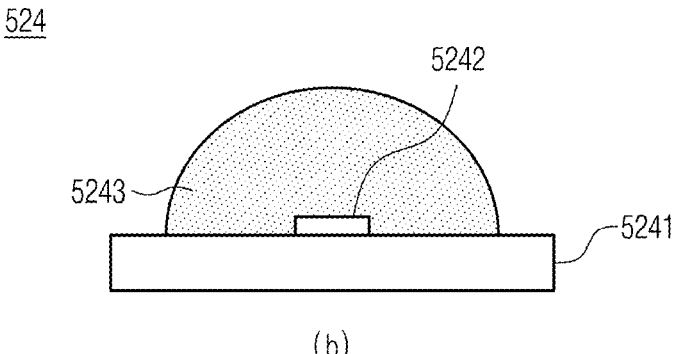
Figure 5:
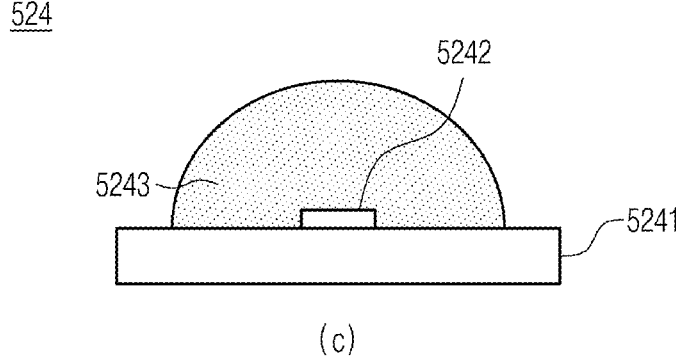

FIG. 5 is a view showing the existing light assembly 524. (a) in FIG. 5 is a plan view, (b) is a cross-sectional view taken along a line b-b in (a), and (c) is a cross-sectional view taken along a line c-c in (a).

A light source lens 5243 covering an upper surface of a light source may be included such that light emitted from an LED 5242, which is a light source of the light assembly 524, may be widely diffused. In this regard, the upper surface may mean a direction in which the light source emits light, that is, a surface of a light source substrate 5241 on which the light source is mounted. Because the LED 5242 may be used as the light source, the light source may be expressed as the LED 5242 hereinafter.

The light source lens 5243 may cover the LED 5242 and have a dome shape. The existing light source lens 5243 for the backlight unit used a method of manufacturing the lens separately and then attaching the lens to an upper surface of the LED 5242.

However, as a size of the LED 5242 decreased, a size of the lens also decreased, making it difficult to manufacture the lens separately and attach the same, so that the light source lens 5243 was able to be manufactured by dispensing resin R on the LED 5242. In this regard, the dispensing means a method of applying a small amount of liquid by dropping the same in a form of a droplet (a liquid drop).

The resin R dispensed on the upper surface of LED 5242 forms a dome shape because of a surface tension phenomenon and is located on the light source substrate 5241. When the resin is cured in the dome shape, the solid light source lens 5243 may be implemented. As the existing light source lens 5243, an isotropic light source lens 5243 having the same shape in all directions as shown in FIG. 5 by dispensing the resin directly above the LED 5242 was used.

The isotropic light source lens 5243 limits arrangement of the plurality of LEDs 5242 that are arranged while forming an array to a grid arrangement close to a square shape. When using the isotropic light source lens 5243, a degree of freedom in design of the light source substrate 5241 is reduced, and an amount of use of the light source substrate 5241 increases, which causes an increase in a component cost. In addition, there is also a problem that a dark spot occurs at a center of the square grid arrangement of the plurality of LEDs 5242.

Therefore, the present disclosure requires to apply an anisotropic light source lens 5243 to the light assembly 524 such that light emitted from the LED 5242 may be further diffused in a desired direction, thereby increasing the degree of freedom in the arrangement of the LEDs 5242.

Figure 6:
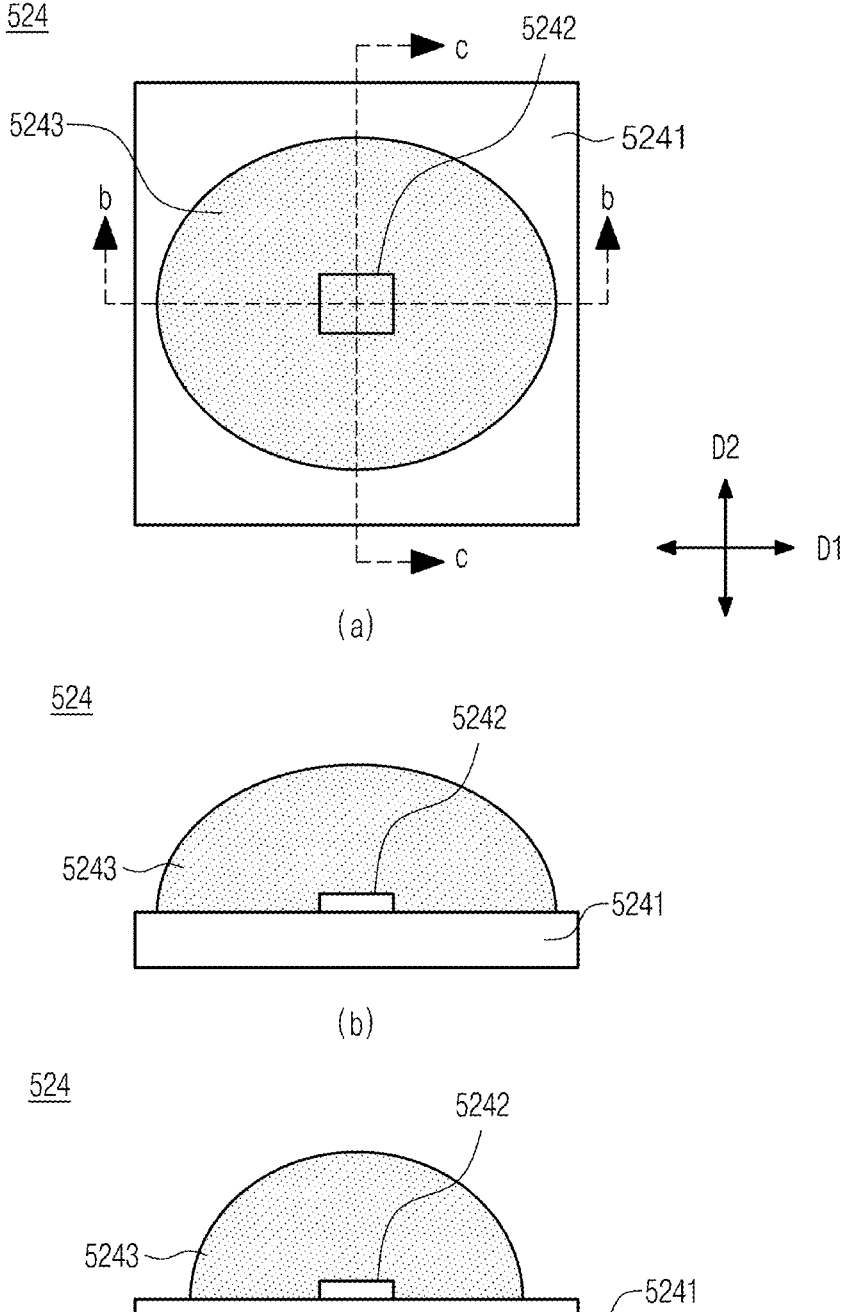
FIG. 6 is a view illustrating a first embodiment of a light assembly of the present disclosure.

FIG. 6 is a view illustrating a first embodiment of the light assembly 524 of the present disclosure. (a) in FIG. 6 is a plan view, (b) is a cross-sectional view taken along a line b-b in (a), and (c) is a cross-sectional view taken along a line c-c in (a).

The light assembly 524 according to the embodiment illustrated in FIG. 6 includes an elliptical light source lens 5243 whose length in a first direction D1 is greater than that in a second direction D2 perpendicular to the first direction D1. The length in the first direction may be 1.3 times or greater the length in the second direction. In this regard, each of the first direction D1 and the second direction D2 may refer to a direction that is parallel and bi-directional, similar to an x-axis direction and a y-axis direction.

In the past, as the anisotropic light source lens, the elliptical light source lens was manufactured using a separate mold instead of applying the resin, and then attached onto the LED 5242.

However, the attachment method creates an air layer between the LED 5242 and the light source lens. Because a refractive index of air is 1, which is significantly different from a refractive index of 1.84 of sapphire glass of the LED 5242, the light source lens using the attachment method has a problem in that a light emission effect is reduced.

Accordingly, the light source lens 5243 of the present disclosure may dispense the liquid resin R containing at least one of silicone, polymethyl methacrylate (PMMA), and polycarbonate (PC) to allow the LED 5242 and the light source lens 5243 to be tightly adhered to each other without the air layer therebetween.

However, because the isotropic light source lens 5243 is formed when dispensing the resin onto the upper surface of the LED 5242 as in the embodiment of FIG. 5 described above, the present disclosure manufactures the anisotropic light source lens 5243 in FIG. 6 in a different manner.

Figure 7:
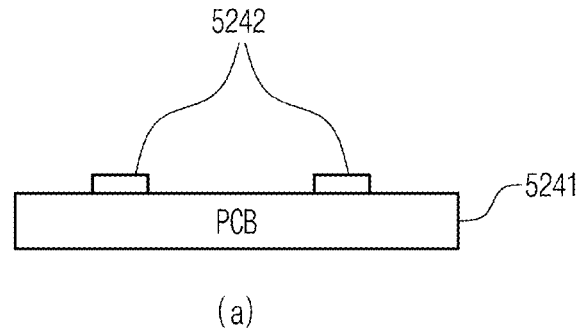
FIG. 7 is a view illustrating a method for manufacturing a light assembly in FIG. 6.
Figure 7:
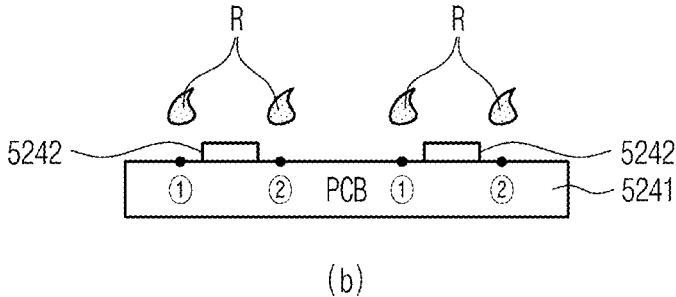
Figure 7:
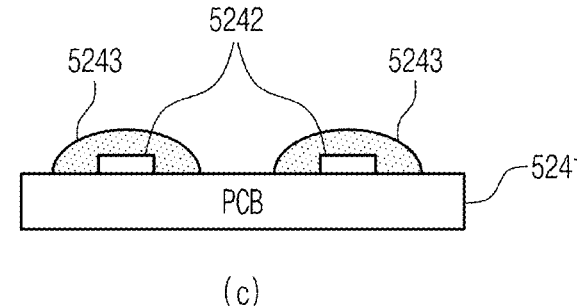

FIG. 7 is a view illustrating a method for manufacturing the light assembly 524 in FIG. 6. As shown in (a) in FIG. 7, the light source substrate 5241 having the LED 5242 mounted thereon may be provided, and the resin R may be applied at locations spaced apart from a center of the LED 5242 on both sides in the first direction D1.

Dispensing the resin R at a first location ① spaced apart from the light source on one side in the first direction D1 and dispensing the resin R at a second location ② spaced apart from the light source on the other side in the first direction D1 may be included. The dispensing of the resin R at the first location ① and the second location ② may be performed sequentially, but may be performed simultaneously as shown in (b) in FIG. 7.

The first location ① and the second location ② may be at the same distance or different distances from the center of the LED 5242. Amounts of the resin R dispensed may be equal to or different from each other. When the first location ① and the second location ② are at the same distance from the center of the LED 5242 and the same amount of the resin R is dispensed, the light source lens 5243 that is symmetrical in the first direction D1 may be implemented.

When the amounts of the resin R are different from each other or the distances are different from each other, an asymmetric light source lens 5243 may be provided in the first direction D1, and in this case, light emitted from the LED 5242 may be asymmetrical in the first direction D1. For example, in a case of an LED 5242 located at an edge, to guide light more in an opposite direction than in a direction of the edge, the light source lens 5243 asymmetric in the first direction D1 may be used.

However, in the present disclosure, the amorphous light source lens 5243 having the different shapes in the first direction D1 and second direction D2 of the light source lens 5243 is a more preferred feature. Therefore, a following description will be based on the light source lens 5243 that is symmetrical in the first direction D1 and symmetrical in the second direction D2, but has the different shapes in the first direction D1 and the second direction D2.

A size of the light source lens 5243 may vary depending on the amount of the resin R droplet dispensed. When the amount of the resin R droplet is great, the size of the lens may increase in the first direction D1 as well as in the second direction D2. Therefore, even when the resin R is dispensed at the same location, the size and a shape of the light source lens 5243 may vary depending on the size (the amount) of the resin R droplet.

In the step (b) in FIG. 7, when a spacing between the first location ① and the second location ② is equal to or smaller than ⅓ of the length in the first direction D1 of the light source lens 5243, the elliptical light source lens 5243 as in FIG. 6 may be provided.

When dispensing the resin R at the first location ① and the second location ② at a pitch (spacing) of 1 mm, the elliptical light source lens 5243 as shown in FIG. 6 having a length of 3.4 mm in the first direction D1 may be obtained.

In this regard, the LED 5242 may have a size of 0.5 mm at a long side, and the LED 5242 may be disposed such that a longitudinal direction thereof matches the first direction D1. To implement light that spreads more in the first direction D1, the light source lens 5243 may also have a length greater in the first direction D1 and the LED 5242 may be disposed such that the longitudinal direction thereof matches the first direction D1.

When the spacing between the first location ① and the second location ② is too small, it may resemble the isotropic light source lens shown in FIG. 5. Therefore, the spacing between the first location ① and the second location ② may be at least greater than the size in the first direction of the LED 5242.

The length of the LED 5242 in the longitudinal direction is about 0.5 mm, so that the spacing between the first location ① and the second location ② may be greater than the size in the first direction D1 of the LED 5242, and the first location ① and the second location ② may not overlap with the LED 5242.

Figure 8:
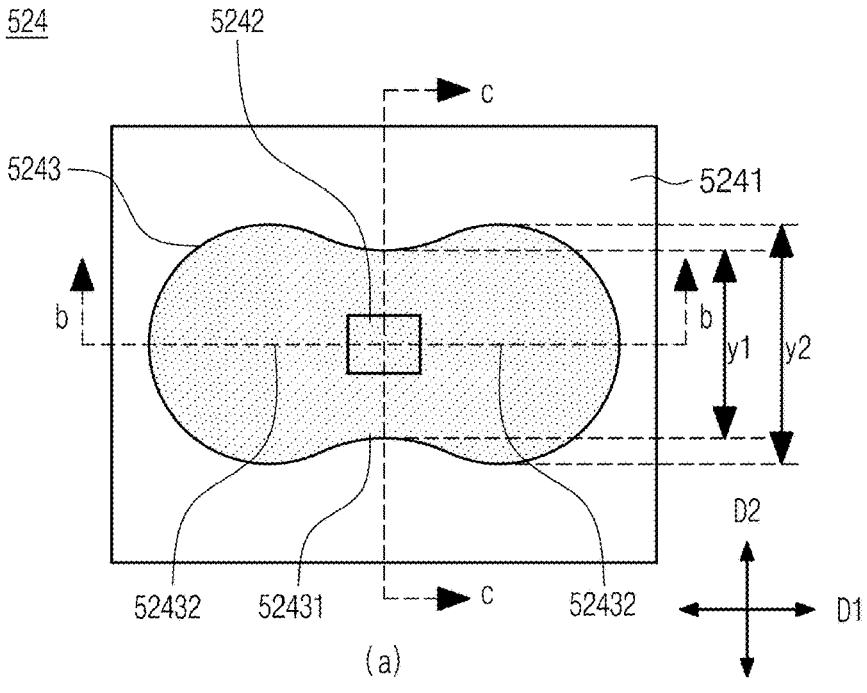
FIG. 8 is a view illustrating a second embodiment of a light assembly of the present disclosure.
Figure 8:
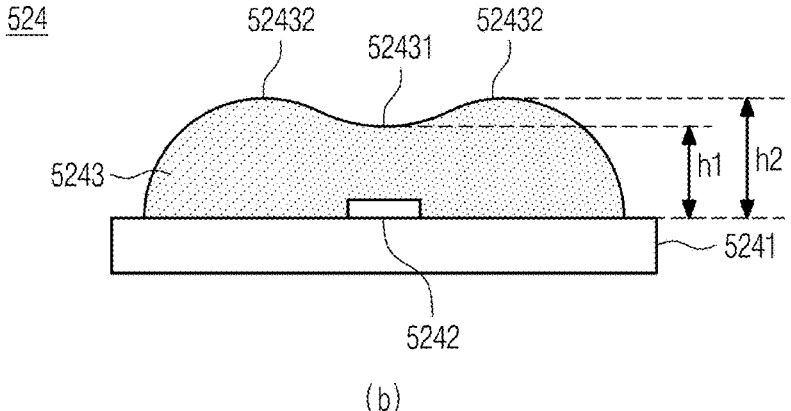
Figure 8:
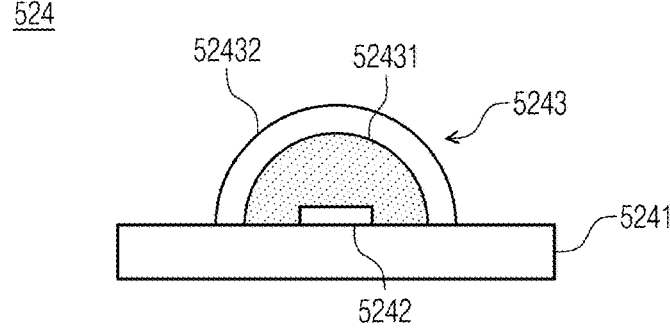

FIG. 8 is a view illustrating a second embodiment of the light assembly 524 of the present disclosure. When the spacing between the first location ① and the second location ② exceeds ⅓ of the length in the first direction D1 of the light source lens 5243, the light source lens 5243 may have a peanut shape as illustrated in FIG. 8.

Because an overlapping area between a first resin R droplet dispensed at the first location ① and a second resin R droplet dispensed at the second location ② is small, an amount of the resin R at a center in the first direction is small, resulting in a concave shape. According to the embodiment in FIG. 8, the resin R droplet may be applied such that the first location ① and the second location ② have a pitch of 2 mm, and a length in the first direction D1 of the light source lens 5243 may be 5 mm.

To implement the peanut-shaped light source lens 5243 of the embodiment in FIG. 8, the spacing between the first location ① and the second location ② may have a pitch of about 40% of the total length of the light source lens 5243. The light source lens 5243 of the embodiment in FIG. 8 will be described in more detail. (a) in FIG. 8 is a plan view, (b) is a cross-sectional view taken along a line b-b in (a), and (c) is a cross-sectional view taken along a line c-c in (a).

The center in the first direction D1 may include a concave portion 52431 that is concavely recessed in both the plan view and the cross-section view. As shown in (b) in FIG. 8, peak portions 52432 at the highest vertical level may be positioned at a predetermined distance from the concave portion 52431 on both sides thereof in the first direction D1 (h2>h1). The vertical levels of the pair of peak portions 52431 are shown to be equal to each other, but the vertical levels thereof may be different from each other. Even when the vertical levels of the pair of peak portions 52432 are different from each other, vertical dimensions thereof may be greater than that of a central portion, so that the concave portion 52431 may be positioned between the pair of peak portions 52432.

Alternatively, three dispensing locations may be set to implement an anisotropic light source lens 5243 having three peak portions 52432 and two concave portions 52431.

The locations of the peak portions 52432 may correspond to the first location ① and the second location ② where the resin R is dispensed, and therefore, a spacing between the pair of peak portions 52432 may be greater than the length in the first direction of the LED 5242.

A length y1 in the second direction D2 of the concave portion 52431 may be smaller than a length y2 in the second direction D2 of the peak portion 52432, so that the concave portion 52431 may have the concave shape not only in the height direction but also in the second direction D2.

Even though the central portion has the concave shape, the light source lens 5243 in the present embodiment has different shapes in a cross-section in the first direction ((b) in FIG. 8) and a cross-section in the second direction ((c) in FIG. 8). The light source lens 5243 in the present embodiment may have the concave portion 52431 that has a shape like a valley located between mountain peaks.

Figure 9:
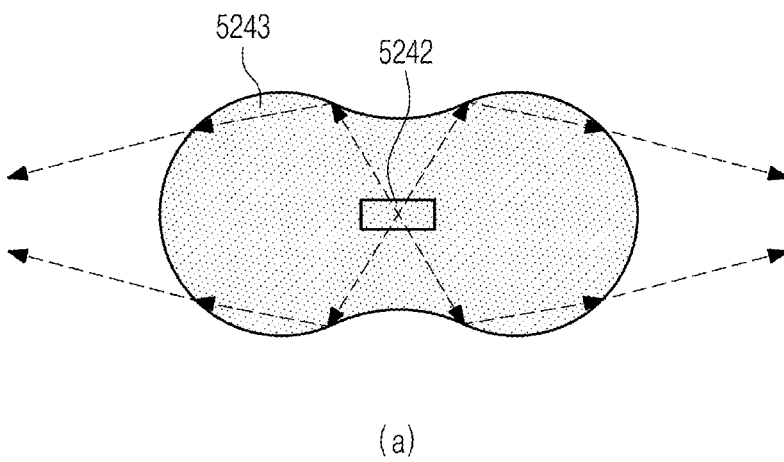
FIG. 9 is a view showing a path of light in a light source lens according to an embodiment in FIG. 8.
Figure 9:
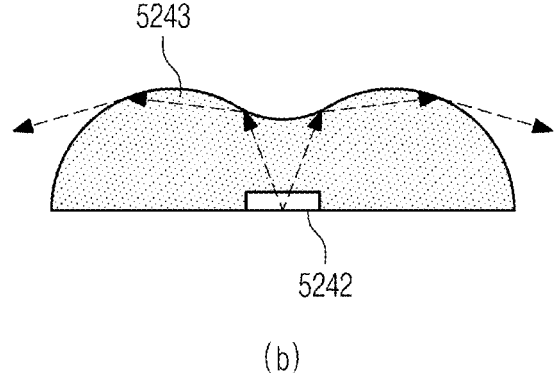

The cross-section in the first direction D1 may have a shape that protrudes on both sides and is concave at the center as shown in (b) in FIG. 8 even when a location of the cross-section changes in the second direction D2, and the cross-section in the second direction may have a semicircular shape as shown in (c) in FIG. 8 even when a location changes in the first direction. FIG. 9 is a view showing a path of light in the light source lens 5243 according to an embodiment in FIG. 8. The concave portion 52431 allows light to not only spread upward but also to undergo total reflection therein, causing light to spread entirely in a lateral direction. The present embodiment may reduce an amount of light emitted upward and enable light to spread broadly in the lateral direction.

Figure 10:
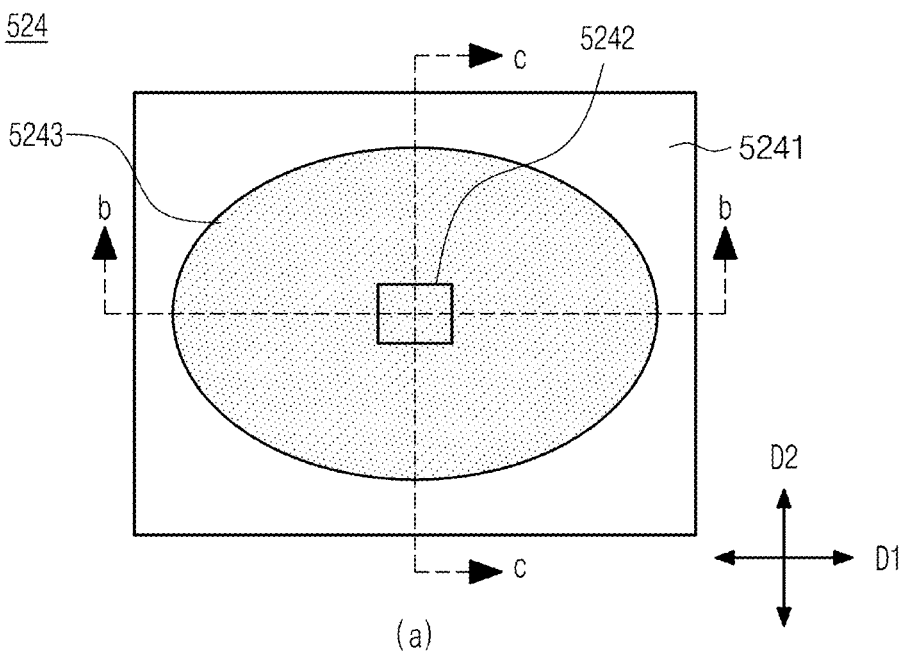
FIG. 10 is a view illustrating a third embodiment of a light assembly of the present disclosure.
Figure 10:
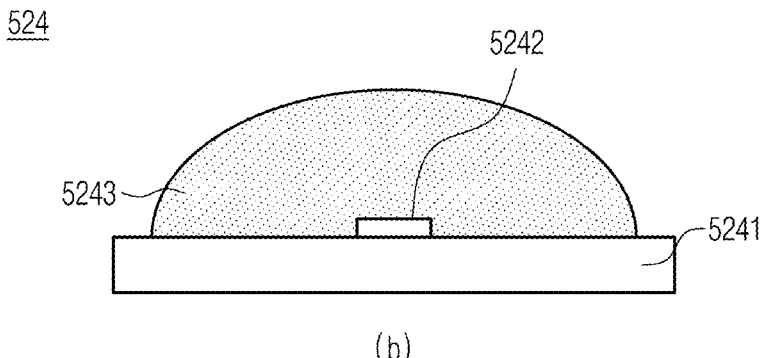
Figure 10:
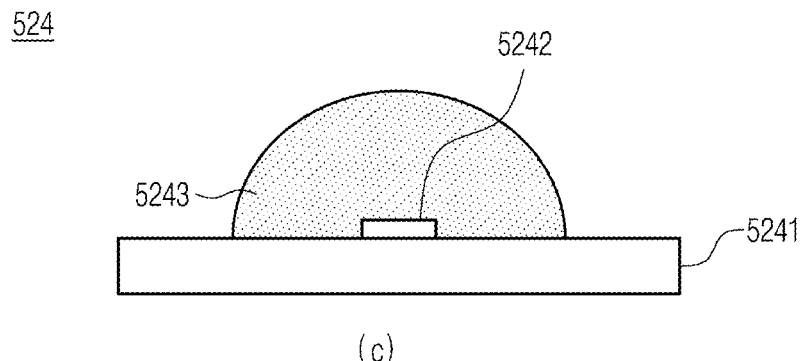

FIG. 10 is a view illustrating a third embodiment of the light assembly 524 of the present disclosure. In the embodiment in FIG. 10, the resin R may be dispensed at three locations. The dispensing may be done three times at the first location ① and the second location ② that are biased from a center of the LED 5242 to both sides in the first direction D1, and at a third location between the first location ① and the second location ②. The third location may be a location that overlaps the LED 5242.

When performing the dispensing three times, an elliptical light source lens 5243 having a great length in the first direction D1 may be obtained. Spacings between the first location ① and the third location and between the third location and the second location ② may have values equal to or smaller than ⅓ thereof.

In the present embodiment, the resin R may be dispensed such that the spacing (the pitch) between the two locations is 1.5 mm, and the length in the first direction D1 of the light source lens 5243 may be 5.15 mm. Because the resin R is dispensed three times, a length in the second direction D2 may be greater than those in the first and second embodiments in FIGS. 6 and 8.

FIG. 11 is a view that graphically illustrates the features of the embodiments of the light assembly 524 of the present disclosure. It is a view that illustrates the shapes of the light source lenses 5243 and the shapes of light in the first to third embodiments.

The first embodiment may implement the light source lens 5243 slightly longer in the first direction D1 as the light source lens 5243 manufactured by dispensing the resin R twice at the first location ① and the second location ② at the spacing of 1 mm.

The second embodiment is the light source lens 5243 manufactured by dispensing the resin R twice at the first location ① and the second location ② with the 2 mm spacing, and has the peanut shape. Therefore, it may be seen that the shape of light is greatly biased toward the first direction D1. As seen in FIG. 9, the total reflection occurs at a central concave portion 5243a and light spreads to both sides in the first direction D1, so that light may be more diffused outward of peak portions 5243b in the first direction D1.

The third embodiment may have the shape with the size in the first direction D1 greater than that of the first embodiment, and the shape of light may have the similar elliptical shape.

FIG. 12 is a graph showing brightness of the anisotropic lenses 5243 implemented by the embodiments of the light assembly 524 of the present disclosure. It shows brightness in the first direction D1 (x-axis) and the second direction D2 (y-axis). In the drawing, a horizontal direction is the first direction D1 and a vertical direction is the second direction D2.

Because the isotropic lens shows the same form of light diffusion in the first direction D1 and the second direction D2, brightness graphs in both directions are also equal to each other, so that an y:x brightness ratio shows 1:1.

Because the light source lens 5243 in the first embodiment (an anisotropic lens 1) is longer in the first direction D1, light may spread more in the first direction D1, and brightness in the first direction D1 may be 1.3 times greater.

The light source lens 5243 in the second embodiment (an anisotropic lens 2) spreads light the most in the second direction D2, and thus exhibits a brightness ratio of 1.8 times in the second direction. This is a value that is greater than a value of 1.6 times of the light source lens 5243 in the third embodiment (an anisotropic lens 3), and the light source lens 5243 in the second embodiment has the best effect of spreading light in the first direction D1.

Figure 13:
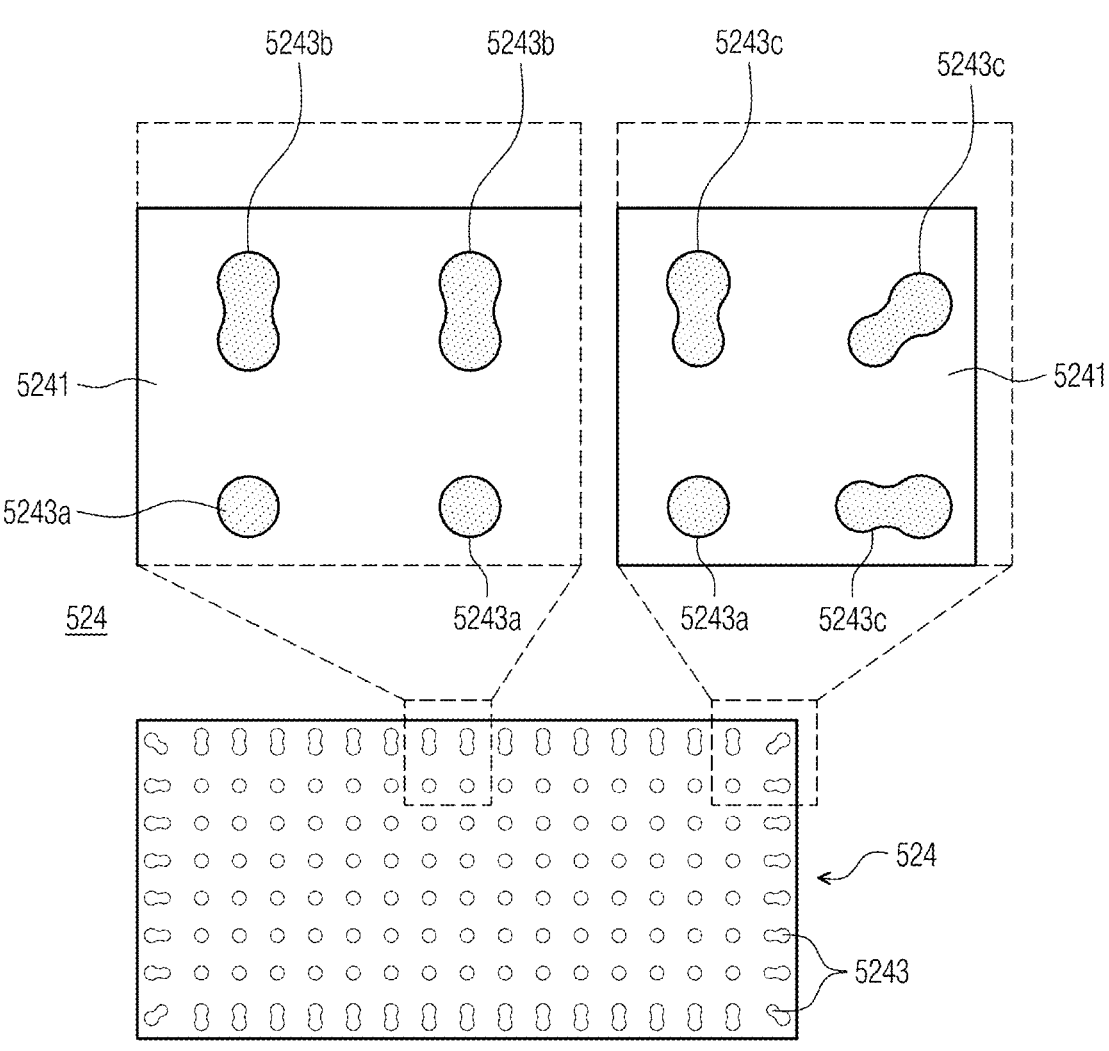
FIG. 13 is a plan view of a light assembly of the present disclosure.

FIG. 13 is a view showing an example of the arrangement of the light source lenses of the light assembly 524 of the present disclosure. One light assembly 524 may include the plurality of LEDs 5242, and the shape of the light source lens 5243 may be changed depending on the location of the LED 5242. As shown in FIG. 13, both an isotropic lens 5243a and anisotropic lenses 5243b and 5243c may be used.

A central portion of the light assembly 524 may realize uniform brightness by light supplied from neighboring LEDs 5242, but an LED 5242 located at an edge of the light assembly 524 has a problem in that brightness thereof is relatively low because there is no neighboring LED 5242 in a direction of an end of the light source substrate 5241.

The problem of the low brightness of the edge of the light assembly 524 may be solved by applying the anisotropic lenses 5243b and 5243c to the edge of the light assembly 524. As shown in FIG. 13, for light source lenses 5243 located at the edge of the light source substrate 5241, the anisotropic lenses 5243b and 5243c may be used. The anisotropic lenses 5243b and 5243c may be disposed such that long sides thereof in the first direction face the edge, thereby supplying more light toward the edge.

Referring to an enlarged view of a corner of the light assembly 524 in FIG. 13, a light source lens located at the corner may be disposed such that a side in a longitudinal direction (the first direction) of the anisotropic shape faces the corner.

In particular, when using the peanut-shaped light source lens 5243 in FIG. 8, the asymmetrical shape may be implemented in the first direction. As shown in the anisotropic light source lens 5243c on a right side in FIG. 13, a light source lens 5243c that implements a greater lens size in a portion facing the edge or the corner to supply more light supplied from the LED 5242 toward the edge of the light assembly 524 may be used.

As described above, the light assembly 524 of the present disclosure may implement light that is diffused in an anisotropic shape via the anisotropic dome-shaped light source lens 5243.

In addition, the light assembly 524 of the present disclosure may easily implement the anisotropic light source lens 5243.

In addition, the light assembly 524 of the present disclosure increases the degree of freedom in the arrangement of the LEDs 5242.

The above embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A light assembly comprising:
a light source substrate having an LED mounted thereon; and a light source lens constructed to cover the LED and having a curved upper surface, wherein the light source lens includes an anisotropic lens with a length in a first direction greater than a length in a second direction perpendicular to the first direction, wherein the light source lens includes:

a concave portion positioned at a center in the first direction; and a pair of peak portions positioned on both sides of the concave portion in the first direction and having a vertical level higher than a vertical level of the concave portion, and wherein a length in the second direction of the concave portion is smaller than a length in the second direction of the peak portions.

2. The light assembly of claim 1, wherein the light source lens has a diffusion angle in the first direction greater than a diffusion angle in the second direction.

3. The light assembly of claim 1, wherein a spacing between the pair of peak portions is greater than a length in the first direction of the LED.

4. The light assembly of claim 1, wherein the pair of peak portions have different vertical levels.

5. The light assembly of claim 1, wherein the LED and the light source lens are in close contact with each other with an air layer omitted therebetween.

6. The light assembly of claim 1, wherein the LED has a greater length in the first direction.

7. The light assembly of claim 1, wherein the length in the first direction of the light source lens is at least 1.3 times the length in the second direction of the light source lens.

8. The light assembly of claim 1, wherein the LED includes a plurality of LEDs arranged in an array in the first direction and the second direction, wherein a spacing between the plurality of LEDs in the first direction is greater than a spacing therebetween in the second direction.

9. The light assembly of claim 1, wherein the light source lens includes at least one of silicone, polymethyl methacrylate (PMMA), and polycarbonate (PC).

10. The light assembly of claim 1, wherein the anisotropic lens positioned at an edge of the light source substrate is disposed such that the first direction aligns with the edge.

11. The light assembly of claim 1, wherein the light source lens includes:

the anisotropic lens disposed adjacent to an edge of the light source substrate; and an isotropic lens disposed at a central portion of the light source substrate.

12. A display device comprising:

a display panel; and a backlight unit located on a rear surface of the display panel and configured to emit light, wherein the backlight unit includes:

a light source substrate having an LED mounted thereon;

a light source lens constructed to cover the LED and having a curved upper surface; and an optical sheet configured to convert light emitted from a light assembly into a uniform surface light source, wherein the light source lens includes:

an anisotropic lens disposed adjacent to an edge of the light source substrate; and an isotropic lens disposed at a central portion of the light source substrate, and wherein the anisotropic lens with a length in a first direction greater than a length in a second direction perpendicular to the first direction.

* * * * *